United States Patent [19]

Gust

[11] Patent Number: 4,519,460

[45] Date of Patent: May 28, 1985

[54] COMPACTION AND SUPPORT APPARATUS

[75] Inventor: Jacob N. Gust, West Fargo, N. Dak.

[73] Assignee: Concord, Inc., Fargo, N. Dak.

[21] Appl. No.: 421,878

[22] Filed: Sep. 23, 1982

[51] Int. Cl.³ .............................................. A01B 49/02
[52] U.S. Cl. .................................... 172/176; 172/310;
172/414; 172/657; 280/677; 111/85
[58] Field of Search ............... 172/176, 179, 149, 150,
172/148, 310, 413, 657, 619, 624, 538, 134, 150,
676, 833, 170; 404/125, 126; 111/59, 52, 85, 61,
54; 280/677, 678; 404/132

[56] References Cited

U.S. PATENT DOCUMENTS

| | | | |
|---|---|---|---|
| 731,658 | 6/1903 | Barry | 111/54 |
| 738,816 | 9/1903 | Kindsvater | 111/52 |
| 1,545,564 | 7/1925 | Krotz | 172/179 |
| 2,270,390 | 1/1942 | Summers | 404/126 |
| 2,685,384 | 8/1954 | Tanke | 222/610 |
| 2,734,439 | 2/1956 | Padrick | 172/156 |
| 2,745,330 | 5/1956 | Nelson | 280/461 |
| 2,756,702 | 7/1956 | Brinton | 111/67 |
| 2,947,372 | 8/1960 | Olson | 172/624 |
| 3,033,135 | 5/1962 | Gouin | 111/52 |
| 3,055,322 | 9/1962 | Oehler et al. | 111/52 |
| 3,060,872 | 10/1962 | Ackley | 111/67 |
| 3,131,657 | 5/1964 | Morris | 111/59 |
| 3,137,073 | 6/1964 | Rawlinson | 33/142 |
| 3,138,125 | 6/1964 | Reaves | 111/52 |
| 3,450,074 | 6/1969 | Gatzke et al. | 111/52 |
| 3,682,252 | 8/1972 | Gates | 172/198 |
| 3,701,327 | 10/1972 | Krumholz | 111/81 |
| 4,112,857 | 9/1978 | Bradley | 111/3 |
| 4,135,457 | 1/1979 | Willis | 111/52 |
| 4,180,005 | 12/1979 | Zumbahlen | 111/52 |
| 4,196,679 | 4/1980 | Moore | 111/85 |
| 4,217,962 | 8/1980 | Schaefer | 172/413 X |
| 4,239,086 | 12/1980 | Yeager | 172/680 |
| 4,273,057 | 6/1981 | Pollard | 111/85 |
| 4,324,296 | 4/1982 | Schenk et al. | 172/311 |
| 4,346,763 | 8/1982 | Swanson et al. | 172/310 X |

FOREIGN PATENT DOCUMENTS

| | | | |
|---|---|---|---|
| 1096685 | 3/1981 | Canada | 172/413 |
| 563255 | 8/1944 | United Kingdom | 172/538 |

Primary Examiner—Richard T. Stouffer
Attorney, Agent, or Firm—Kinney & Lange

[57] ABSTRACT

A compaction and support apparatus for packing the ground immediately after tillage includes a frame and a wheel support gang movably mounted adjacent a rearward end of the frame. A plurality of tillers are supported in spaced relation from the frame, and a plurality of compaction and support wheels are rotatably mounted on the wheel support gang. Adjacent wheels are staggered longitudinally to track spaced apart substantially parallel paths on the ground. The path of each wheel is aligned behind one of the tillers mounted on the frame and the wheel is mounted on the wheel support gang so that the wheel substantially follows the contour of the ground while supporting the frame for transport and operation. The frame height is adjustable relative to the wheel support gang for controlling the extent of tiller penetration into the ground.

19 Claims, 10 Drawing Figures

COMPACTION AND SUPPORT APPARATUS

BACKGROUND OF THE INVENTION

1. Field of the Invention

The present invention relates to agricultural implements, and specifically to an apparatus for supporting a tillage implement and providing compaction for said implement.

2. Description of the Prior Art

Compaction immediately after planting is very beneficial to crop yields. When soil is packed around the newly-planted seed, moisture is retained in the soil by expelling the air in the soil. As a result, the seed does not dry out and can draw water up for growth. Besides increasing the crop yield, compaction also conserves valuable field moisture and reduces topsoil erosion by both water and wind. Additionally, when the tillage and compaction functions are combined on one implement, fuel and labor costs are reduced substantially by elimination of the need for a second separate compaction pass after the seeds have been sown.

Various compaction devices for packing the soil after tilling are well known in the prior art. Often, such devices are pivotally mounted behind a tilling disk or shoe which is supported from a frame secured to the rear of a tractor. Examples of devices of this type are shown in the following United States patents:

| Inventor | U.S. Pat. No. | Issue Date |
|---|---|---|
| Tanke | 2,685,384 | 08/03/54 |
| Padrick | 2,734,439 | 02/14/56 |
| Nelson | 2,745,330 | 05/15/56 |
| Brinton | 2,756,702 | 07/31/56 |
| Olson | 2,947,372 | 08/02/60 |
| Oehler et al | 3,055,322 | 09/25/62 |
| Rawlinson | 3,137,073 | 06/16/64 |
| Gatzke et al | 3,450,074 | 06/17/69 |
| Bradley | 4,112,857 | 09/12/78 |
| Yeager | 4,239,086 | 12/16/80 |

Other tillage and compaction implements have been designed to be drawn behind a tractor. In these devices, separate transport wheels are provided to support the implement (including the tillers and press wheels) when raised for turning or transport to a different location. In operation, the tillers and press wheels are lowered so that the press wheels track a path behind the tillers to pack the soil. Examples of such devices are found in the following United States patents:

| Inventor | U.S. Pat. No. | Issue Date |
|---|---|---|
| Ackley | 3,060,872 | 10/30/62 |
| Reaves | 3,138,125 | 06/23/64 |
| Krumholz | 3,701,327 | 10/31/72 |
| Moore | 4,196,679 | 08/08/80 |
| Pollard | 4,273,057 | 06/16/81 |

Some implements in the prior art have compaction wheels that also act as support wheels for the implement. One such device is shown in U.S. Pat. No. 4,135,457, granted to Willis on Jan. 23, 1979. In Willis, each packing wheel is adjusted individually to vary the height of the coulter directly in front of it. The Willis device is not a plurality of coulters and press wheels secured together, but is a singular unit adapted for attachment to a transverse tow bar secured behind a tractor.

The corn planter shown in U.S. Pat. No. 731,658, granted to Barry on June 23, 1903, also has supporting wheels which serve as packing wheels. This device has a pair of pivotal wheel mounts, with each wheel mount having a pair of wheels shafted on the same axle to track behind the tillers. Because the wheel mounts are pivotally mounted, each pair of wheels can pivot laterally with respect to the implement to facilitate corn planting on uneven terrain.

Some crops can be efficiently grown in closely spaced rows. Implements for tilling, seeding and packing the soil over the seeds for such crops are shown in U.S. Pat. No. 3,033,135, granted to Gouin on May 8, 1962 and U.S. Pat. No. 738,816, granted to Kindsvater on Sept. 15, 1903. Gouin shows an agricultural implement wherein all the packer wheels are aligned on a common axis behind the tiller shoes. The mounting support for the packer wheels is pivotally mounted on a longitudinal axis so that the mounting support and packer wheels thereon can, to a limited extent, pivot laterally with respect to the frame of the implement. The tiller shoes can be raised or lowered from the frame so the packing wheels provide both compaction and transport support for the implement. In the Kindsvater implement, each press wheel is individually mounted behind a tiller and a spring is positioned on each press wheel mount to urge the press wheel thereon toward the ground. Thus, each press wheel moves independently of the other wheels to follow the contours of the ground. These press wheels do not provide support for the Kindsvater implement during transport or operation, and though independently mounted, the wheels are all shafted on a substantially common axis laterally behind the implement.

When packing wheels are closely spaced, such as those shown in the Gouin and Kindsvater patents, soil can collect in the close spaces between the wheels (especially when the soil is moist) and diminish their effectiveness. To this end, various mud cleaners have been provided in the prior art, such as those shown in U.S. Pat. No. 3,682,252, granted to Gates on Aug. 8, 1972. The problem is not fully alleviated by such devices, however.

Another method of compaction is to pull a large metal coil over the soil, either attached behind a tillage implement or in a separate pass. Such coils do not support the tillage implement, and thus are not heavy enough to compact the soil effectively. Additionally, compaction by such coils is not specifically directed to the area of soil containing newly-planted seed.

None of the prior art devices discussed above show an implement providing both tillage and compaction wherein the compaction wheels provide support for the weight of the implement and are able to independently follow the contours of the ground. In addition, where prior art compaction wheels are provided for closely spaced crops, the packer wheels have the problems of mud collection which creates uneven and inefficient packing.

SUMMARY OF THE INVENTION

The apparatus of the present invention overcomes these problems. The compaction wheels of the apparatus support the tillage implement during operation and transport and track the contours of the ground independently of one another. The wheels carry the weight of the tillage implement to provide sufficient compaction around the seed. The axles of the wheels are staggered longitudinally to alleviate possible mud build-up between wheels and means are provided to selectively vary the height of the tillage implement relative to the ground.

The present invention is a compaction apparatus for packing the ground immediately after tillage and supporting a tillage implement for transport and operation. The compaction apparatus has a frame from which a plurality of tillers are supported in spaced relation. A wheel support gang is pivotally mounted adjacent a rearward end of the frame to extend rearwardly from the frame. A plurality of compaction and support wheels are rotatably mounted on the wheel support gang, preferably in pairs. Adjacent wheels are staggered longitudinally and track spaced apart substantially parallel paths on the ground with the path of each wheel aligned behind one of the tillers on the frame. Vertically movable means are provided for mounting the wheels on the wheel support gang so that each wheel substantially follows the contours of the ground while supporting the frame for transport and operation. Frame height control means are provided to adjust the height of the frame relative to the wheel support gang and thereby control the extent of tiller penetration into the ground.

The frame has hitch means movably mounted on a forward end of the frame so that the height of the frame can be adjusted relative to the hitch means. The frame height control means adjusts the height of the frame relative to the wheel support gang to maintain the frame in position so that all of the tillers penetrate the ground at substantially the same depth. Mounting means are provided for mounting the wheel support gang to the frame so that the wheel support gang pivots on lateral and longitudinal axes relative to the frame. Such mounting further increases the ability of the compaction wheels to follow the contours of the ground during operation and transport.

It is often desirable to till and compact a relatively wide area in one pass over the soil. To this end, the implement frame has a central portion and at least one wing portion pivotally mounted longitudinally to the central portion on a side of the central portion. At least one wheel support gang is movably mounted on each frame portion to extend rearwardly from the frame to provide separate support and compaction means for each frame portion. Hitch means are movably mounted on a forward end of the central frame portion so that the height of the frame is adjustable relative to the hitch means. The frame height control means has means for varying the height of each frame portion relative to the wheel support gangs mounted thereon. These varying means are operably connected so that the frame height control means adjusts the height of the frame portions simultaneously to raise and lower the entire frame and maintain the frame portions substantially parallel to the ground at all heights.

DETAILED DESCRIPTION OF THE PREFERRED EMBODIMENTS

Figure 1:
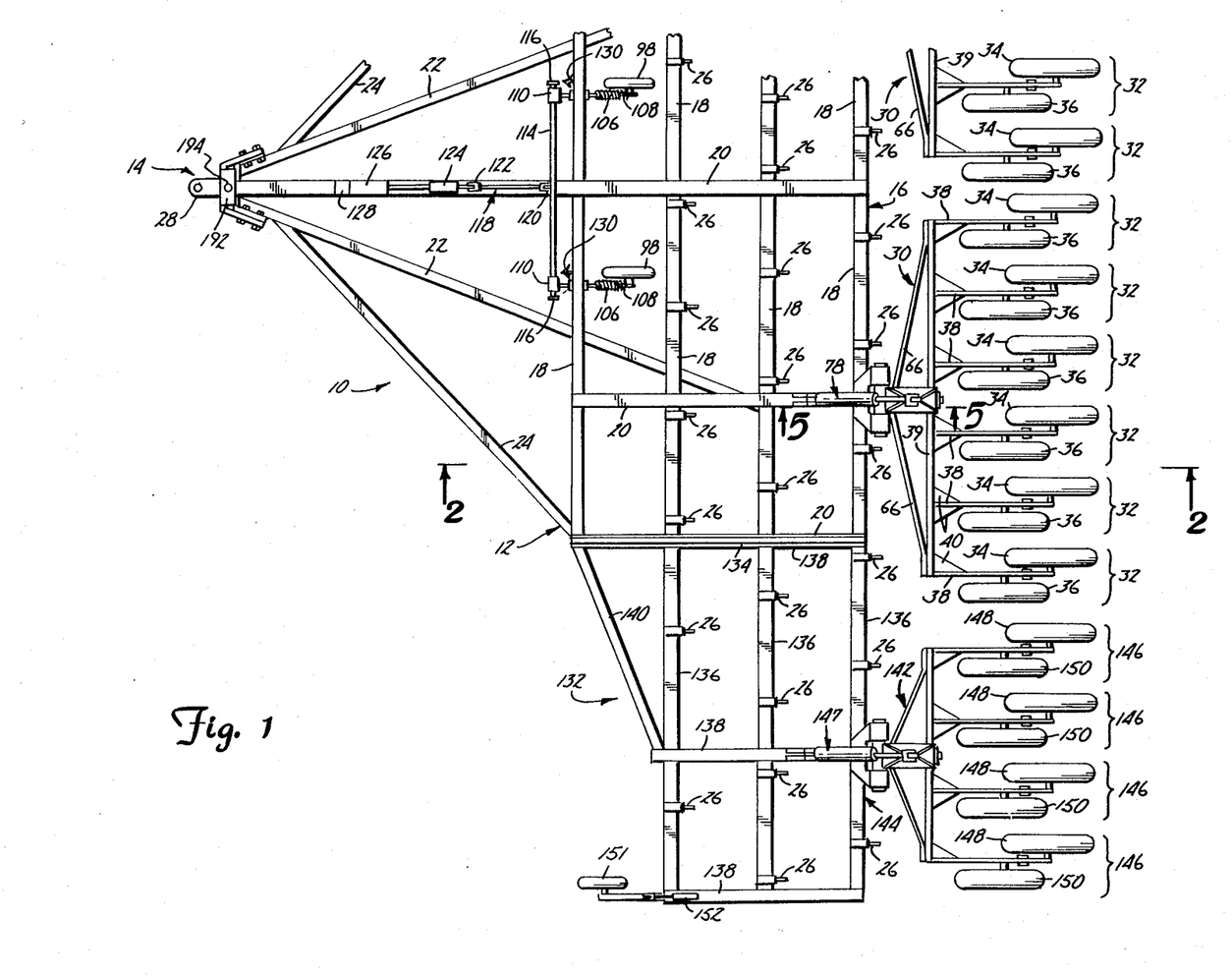
FIG. 1 (sheet 1) is a top plan view of a tillage implement having the compaction and support apparatus of the present invention.

FIG. 1 shows a tillage implement 10 having a compaction and support apparatus of the present invention. The implement 10 has a main frame 12 with a forward end 14 and a rearward end 16. The frame 12 is comprised of a plurality of transversely extending tool bars 18 spaced apart and secured to a plurality of longitudinal frame members 20. Diagonal members 22 and 24 extend radially rearwardly from the forward end 14 of the frame 12 and are secured at suitable portions of the frame 12 as shown.

Figure 2:
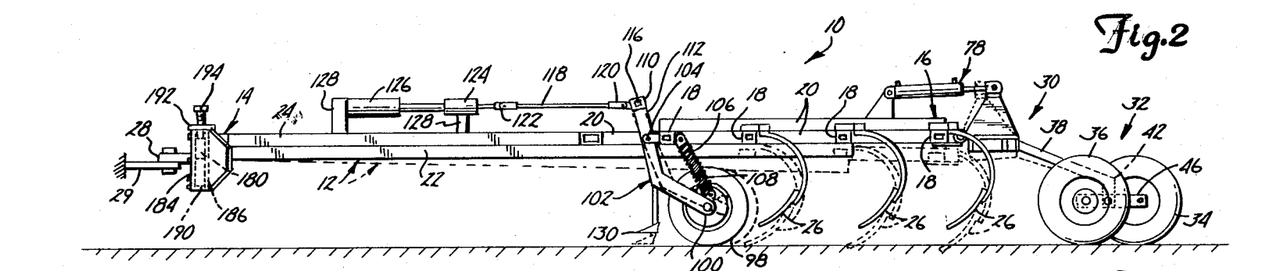
FIG. 2 (sheet 2) is a vertical sectional view taken along line 2—2 of FIG. 1.
Figure 3:
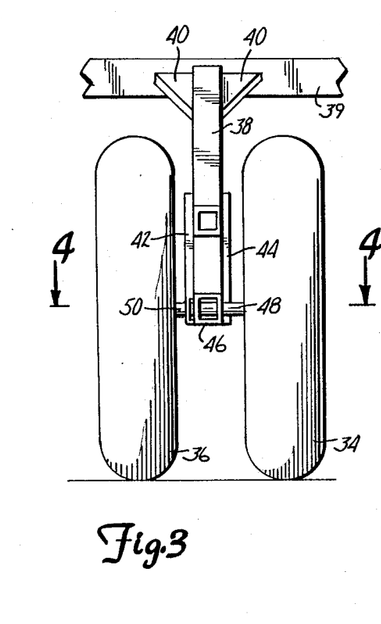
FIG. 3 (sheet 2) is a rear elevational view of one pair of the compaction and support wheels of the present invention.

Various tillage implements, such as chisel plows or tillers 26, are secured in spaced apart relation on certain tool bars 18, as shown in FIGS. 1 and 2. The tillers 26 are staggered both longitudinally and laterally on the frame 12 so that the ground is uniformly turned during operation of the implement 10.

A hitch 28 is movably mounted at the forward end 14 of the frame 12 for securing the implement 10 to a draw bar 29 (see FIG. 2, sheet 2) of a tractor or drawing vehicle (not shown). At least one wheel support gang 30 is movably mounted on the frame 12 to extend rearwardly therefrom. A plurality of compaction and support wheel pair assemblies 32 is rotatably mounted on each wheel support gang 30 and each wheel pair assembly 32 has a first wheel 34 and a second substantially parallel wheel 36 which are staggered longitudinally relative to the frame 12 and wheel support gang 30. The wheels 34 and 36 are positioned to track substantially parallel paths on the ground and each wheel 34 and 36 is aligned rearwardly of one of the tillers 26 on the frame 12 to compact the ground just worked by the tiller 26 during operation of the implement 10.

Figure 4:
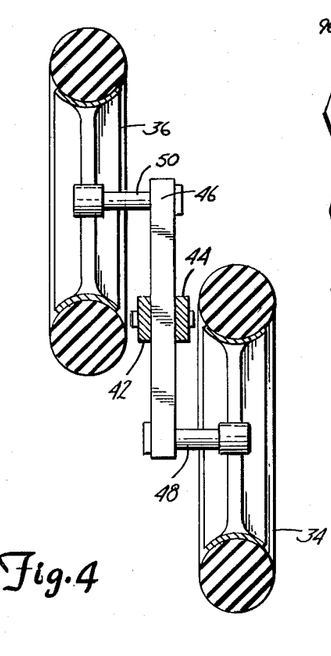
FIG. 4 (sheet 2) is a horizontal sectional view taken along line 4—4 of FIG. 3.

Each wheel pair assembly 32 is mounted on the wheel support gang 30 as shown in FIGS. 1-4 (sheets 1 and 2). As shown in FIG. 2, an arm 38 extends rearwardly from a cross beam 39 of the wheel support gang 30. Each arm 38 is secured to the wheel cross beam 39 and braced by gussets 40. Secured at a rearward end of the arm 38 are a pair of plates 42 and 44 which extend downwardly from the arm 38. Pivotally mounted between the lower ends of the plates 42 and 44 is a walking beam 46. As best shown in FIG. 4, an axle 48 of the first wheel 34 is mounted at a first end of the walking beam 46 and an axle 50 of the second wheel 36 is mounted at a second end of the walking beam 46. Each wheel 34 and 36 is mounted on its respective axle 48 and 50 so that the wheel rotates freely. Thus, the walking beam 46 provides a means for positioning the wheels 34 and 36 independently of one another rotationally, with every first wheel 34 of the wheel support gang 30 shafted on an axis displaced from the axis of the second wheel 36 next to it.

Mounting the wheels 34 and 36 on the walking beam 44 in this manner and pivotally mounting the walking beam 46 to the wheel support gang 30 provides vertically movable means for mounting each wheel on the wheel support gang which allows each wheel 34 and 36 to follow the contour of the ground as the implement 10 is drawn over uneven terrain. In addition, staggering the axles of the wheels substantially reduces the problems of mud and soil build-up between the wheels which reduces their compaction and transport effectiveness by hampering free rotation of the wheels.

Figure 5:
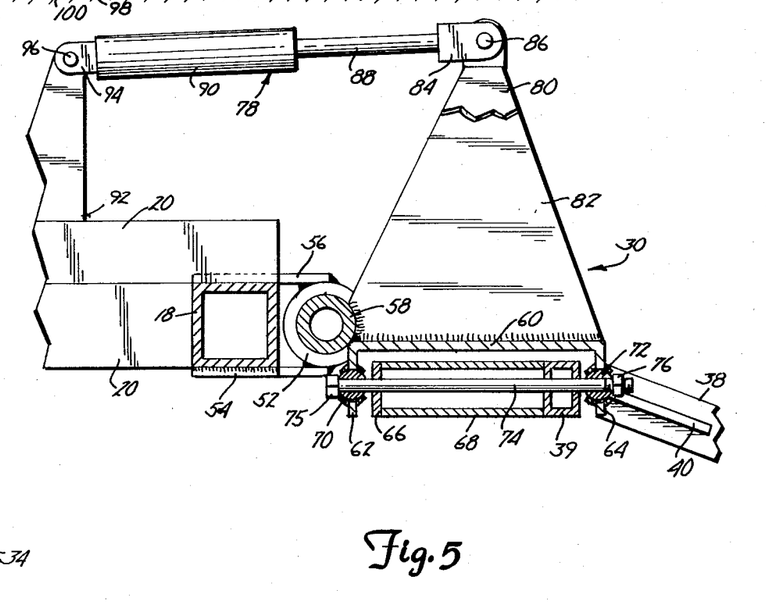
FIG. 5 (sheet 2) is an enlarged vertical sectional view taken along line 5—5 of FIG. 1.
Figure 6:
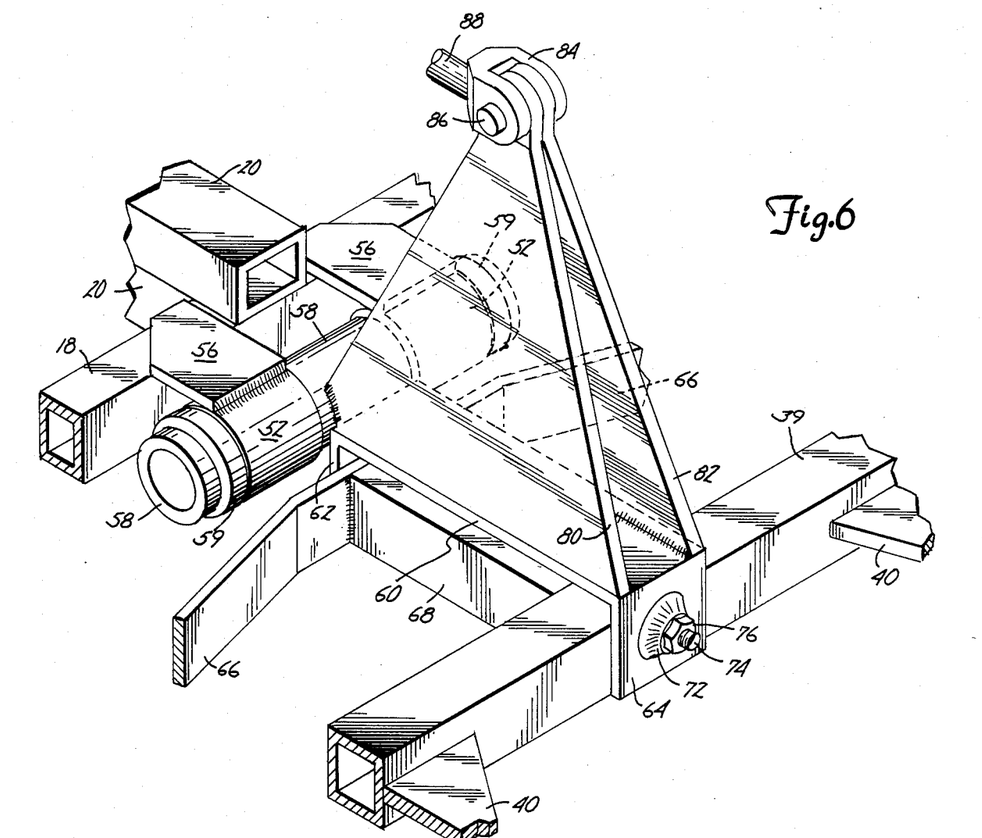
FIG. 6 (sheet 3) is an enlarged perspective view of the two-directional pivot asembly for each wheel support gang of the present invention.

Each wheel support gang 30 is movably mounted to the frame 12 by a two-directional pivot assembly, best shown in FIGS. 5 and 6 (sheets 2 and 3, respectively). A pair of collars 52 are secured to the rearmost tool bar 18 by plates 54 and 56. The collars 52 are mounted laterally to the frame 12 on a common axis. Rotatably mounted on the same axis within the collars 52 is a pivot tube 58. An annular ring 59 is secured at each end of the tube 58 to prevent it from sliding axially in the collars 52.

The collars 52 are spaced apart, as shown in FIG. 6, so that a central portion of the pivot tube 58 is exposed. A pivot platform 60 is secured to this exposed portion of tube 58 so that the platform 60 extends generally rearwardly from the tube 58. The platform 60 has a downwardly extending portion 62 adjacent tube 58 and a substantially parallel downwardly extending portion 64 at its rearmost end. Because the pivot platform 60 is secured to the tube 58, the platform 60 pivots longitudinally relative to the frame 12 as the tube 58 is rotated within the collars 52.

Figure 7:
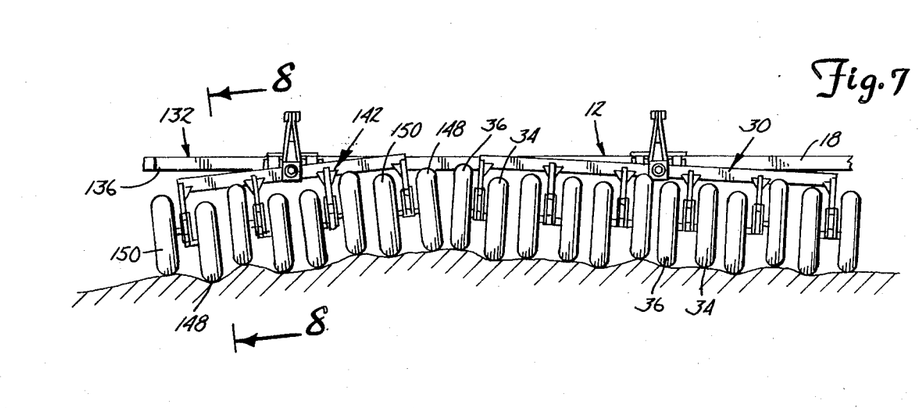
FIG. 7 (sheet 4) is a rear elevational view of the compaction and support apparatus of the present invention showing the operation of the wheel support gangs and compaction wheels on uneven terrain.

As stated, the wheel support gang 30 has a cross beam 39 extending laterally relative to the frame 12. A brace 66 is secured at each end of the cross beam 39 to extend forwardly from the cross beam 39 as shown in FIG. 1. As shown in FIG. 2, a strut 68 extends forwardly from the approximate midpoint of the cross beam 39 and is secured to the brace 66. The downwardly extending portions 62 and 64 of the platform 60 have ball joints 70 and 72 rotatably embedded therein with the ball joints 70 and 72 having throughbores for acceptance of a pivot pin 74. Strut 68 is hollow and cross beam 39 and brace 66 are apertured to allow pivot pin 74 to pass through the strut 68 and the throughbores of the ball joints 70 and 72, as shown in FIG. 5. The pivot pin 74 has a head 75 at one end and a fastener, such as nut 76, at its other end for securing the pin 74 in place. The ball joint and pivot pin combination secures the wheel support gang 30 to the frame 12 while allowing the gang 30 to pivot laterally relative to the frame 12 (as shown in FIG. 7, sheet 4) when the implement 10 is on uneven ground. The pin 74 is removable so that wheel support gang 30 may be removed from the frame 12 for replacement or repair.

The two-directional pivot assembly of each wheel support gang 30, as well as allowing the gang 30 to pivot laterally with respect to the frame 12, also provides a means for pivoting the gang 30 longitudinally with respect to the frame 12. This longitudinal pivot action provides the means for adjusting the height of the frame 12 relative to the wheel support gang 30 and thus controls the extent of tiller penetration into the ground. FIG. 2 shows the implement 10 with its frame 12 raised so that the tillers 26 clear the surface of the ground. In this position, the implement 10 is ready for transport since the tillers 26 are raised a sufficient distance above the surface of the ground so that they will not impede the movement of the implement 10. The wheels 34 and 36 provide the primary means of support for the implement 10 (along with the hitch 28) during transport.

In FIG. 2, portions of the implement 10 are shown in phantom to illustrate their positions when the frame 12 is lowered for tillage operations. The frame 12 is lowered so that a portion of each tiller 26 engages the ground by pivoting the wheel support gang 30 about the axis of pivot tube 58 on the two-directional pivot assembly. In the lowered position, the wheels 34 and 36 still provide the primary means of support for the weight of the implement 10. However, the wheels 34 and 36 also provide compaction for the ground just worked by the tiller 26 positioned immediately in front of each wheel 34 and 36.

The extent of longitudinal pivot about the axis of pivot tube 58 of the two-directional pivot assembly is controlled by a two-directional hydraulic actuator 78 pivotally mounted between the frame 12 and wheel support gang 30. As shown in FIGS. 5 and 6, the pivot platform 60 has a pair of generally upstanding plates 80 and 82 fastened together and apertured at their upper ends. An apertured yoke 84 is pivotally mounted on the plates 80 and 82 by means of a pivot pin 86. Secured to the yoke 84 is a piston rod 88 of the hydraulic actuator 78. A cylinder portion 90 of the hydraulic actuator 78 is pivotally mounted to the frame 12 on a mounting member 92, which is secured on the frame member 20. An apertured yoke 94 is secured on the cylinder portion 90 of the hydraulic actuator 78 is aligned with an aperture at an upper end of the mounting member 92 for acceptance of a pivot pin 96, thus providing a pivotal support for the hydraulic actuator 78 upon the frame 12.

Full extension of the hydraulic actuator 78 (as shown in FIGS. 2 and 5) places the implement 10 in position for transport by raising the tillers 26 above the ground's surface. Retraction of the actuator 78 lowers the tillers 26 toward and into the ground, as desired. The operation of hydraulic actuator 78 is continuous, thus allowing the height of the frame 12 to be adjusted to any position within the range of extension of the actuator 78. In phantom, FIG. 2 shows the implement 10 in position for tilling wherein the hydraulic actuator 78 is retracted so that a portion of each tiller 26 engages the ground.

The hydraulic actuator 78 is adjustable to any preselected position. In addition, the implement 10 is provided with ground gauging means so that even as the implement 10 passes over uneven terrain, the tillers 26 are maintained at substantially the same depth with respect to the surface of the ground. As shown in FIGS. 1 and 2, the ground gauging means includes a pair of gauging wheels 98. Each gauging wheel 98 is pivotally mounted at a lower end 100 of a rocker arm 102. Each rocker arm 102 is in turn pivotally mounted to the frame 12, as at 104. A shock absorber 106 and spring 108 are pivotally mounted between the frame 12 and the lower end 100 of each rocker arm 102. The spring 108 urges the lower end 100 of the rocker arm 102 toward the ground, thereby maintaining the gauging wheel 98 mounted thereon in contact with the ground. The shock absorber 106 is provided to prevent quick changes in the height of the lower end 100 of the rocker arm 102 relative to the frame 12, such as when the gauging wheel 98 drops into a hole in the ground or runs over a bump.

A collar 110 is secured to an upper end 112 of each rocker arm 102. As shown in FIGS. 1 and 2, a cross beam 114 operably connects the two rocker arms 102 by fitting loosely in each collar 110. A stop 116 is secured at each end of the cross beam 114 to prevent it from sliding laterally in the collars 110. A valve shaft 118 is pivotally fastened at its rear end 120 to the cross beam 114 at its midpoint as shown in FIG. 1. The valve shaft 118 is pivotally fastened at its front end 122 to a control valve 124, which governs the extension of the hydraulic actuator 78.

Actuation of the control valve 124 determines the direction of flow of hydraulic fluid to and from the hydraulic actuator 78, which in turn adjusts the height of the implement 10 relative to the ground. The operation of valve 124 is mechanically controlled, such as by a linear actuator 126 so that the height of the frame 12 can be adjusted to any desired position within the range of operation of the actuator 78. The use of a linear actuator 126 allows the height of the frame 12 to be controlled from a remote position (such as a tractor cab) by suitable actuator control means (not shown). The control valve 124 and linear actuator 126 are mounted on the frame 12 by suitable means, such as supports 128.

Once the desired frame height has been achieved by actuation of valve 124, the ground gauging means then operates to maintain the frame 12 at substantially the same height relative to the ground as the implement 10 passes over uneven terrain. The gauging wheels 98 track the ground and through rocker arm 102 and shaft 118 convey differences in the terrain to the valve 124. The valve 124 thus diverts hydraulic fluid to the hydraulic actuator 78 to extend or retract it in response to the signal received from the shaft 118 of the ground gauging means.

For example, as the implement 10 passes over the crest of a hill, the gauging wheels 98 are urged upwardly relative to the frame 12. The rocker arm 102 pivots at 104 in a generally counterclockwise direction (as viewed in FIG. 2) thus forcing the shaft 118 toward the valve 124. The valve 124 reacts to the mechanical movement of the shaft 118 to extend the hydraulic actuator 78 in an amount proportional to the movement of the shaft 118. The extension of the hydraulic actuator 78 pivots the wheel support gang 30 about the axis of the pivot tube 58 thereby raising the frame 12 relative to the ground so that the tillers 26 do not gouge into the crest of the hill as the implement 10 passes over it. As the implement 10 starts down the other side of the hill, the gauging wheels 98 (urged downwardly by the spring 108) track the surface of the ground causing the rocker arm 102 to pivot clockwise at 104 to move the shaft 118 away from the valve 124. The valve 124 reacts to the movement of the shaft 118 by retracting the hydraulic actuator 78 so that the frame 12 and tillers 26 are constantly maintained in their prior desired positions relative to the ground.

The ground gauging means is provided with two spaced apart gauging wheels 98 so that the movement of the cross beam 114 presents an average movement value to the control valve 124 (relative to the actual movement of the two gauging wheels 98). Thus, when one of the gauging wheels 98 passes over an isolated change (such as a hole) in the surface of the ground, the entire height of the frame 12 is not adjusted in a proportional amount to the change in the position of that gauging wheel 98, but rather to an average of the changes in the ground's surface detected by the two gauging wheels 98 together. To further assist the ground gauging means to obtain accurate readings of the terrain, a clearance plow 130 is positioned in front of each gauge wheel 98 to brush aside rocks or debris from the path of the wheel 98.

Because of the need to pass through gates or be transported along public highways, the lateral width of the frame 12 of the implement 10 is limited. However, once in the field, it is much more efficient to have as wide an implement as possible to reduce the number of passes necessary to work a certain area. To this end, wing portions are pivotally mounted longitudinally on the sides of the main frame 12 to extend outwardly during tillage operations. For transport, the wings are folded up and are carried by the main frame 12 in conventional fashion.

A wing 132 is shown in FIG. 1 pivotally mounted on a longitudinal axis at 134 to the main frame 12. Like the main frame 12, the wing 132 has a plurality of transversely extending tool bars 136 spaced apart and secured to a plurality of longitudinal frame members 138. A diagonal member 140 extends angularly across the wing 132 and is secured at suitable portions of the wing 132 as shown. Secured on the wing 132 in the same relation as those secured on the main frame 12 are a plurality of tillage implements, such as tillers 26.

A wheel support gang 142 is movably mounted adjacent a rearward end 144 of the wing 132. The wheel support gang 142 extends rearwardly from the wing 132 and a plurality of compaction and support wheel pair assemblies 146 is rotatably mounted on the wheel support gang 142. Each wheel pair assembly 146 has a first wheel 148 and a second substantially parallel wheel 150 which are staggered longitudinally relative to the wing 132 and wheel support gang 142. The wheels 148 and 150 are positioned to track substantially parallel paths on the ground and each wheel 148 and 150 is aligned rearwardly of one of the tillers 26 on the wing 132 to track the ground just worked by the tiller 26 during operation of the implement 10.

The wheel support gang 142 is movably mounted on the wing 132 in the same fashion (by a two-directional pivot assembly) as the wheel support gang 30 is movably mounted on the main frame 12. It is important to note that the wheel support gang 142 of the wing 132 pivots transversely relative to the implement 10 independently of the transverse pivoting of each wheel support gang 30 mounted on the main frame 12, as FIG. 7 illustrates. In addition, the wheel support gang 142 of the wing 132 pivots longitudinally relative to the implement 10 to control the extent of tiller penetration into the ground. The wheel support gang 142 is pivoted to the wing 132 independently from the pivotal arrangement of each wheel support gang 30 on the main frame 12, and the extent of longitudinal pivot of the wheel support gang 142 relative to the wing 132 is controlled by a two-directional hydraulic actuator 147. The actuator 147 is pivotally mounted between the wing 132 and the wheel support gang 142 in the same manner as the actuator 78 between the main frame 12 and the wheel support gang 30.

Each frame portion is supported primarily by the independent operation of the wheel support gang (or gangs) mounted thereon. The wing 132 is additionally provided with a lead wheel 151 at its outermost leading edge, as shown in FIG. 1. The position of the lead wheel 151 under the wing 132 is adjustable by a crank 152 so that the lead wheel 151 will give supplemental support to the wing 132 when the implement 10 is drawn over rough terrain. The lead wheel 151 is not provided to normally support the weight of the wing 132, but to prevent the tillers 26 mounted on the wing 132 from digging deeply into the ground and thereby damaging themselves when the wing 132 encounters a steep hillside or ditch.

Figure 8:
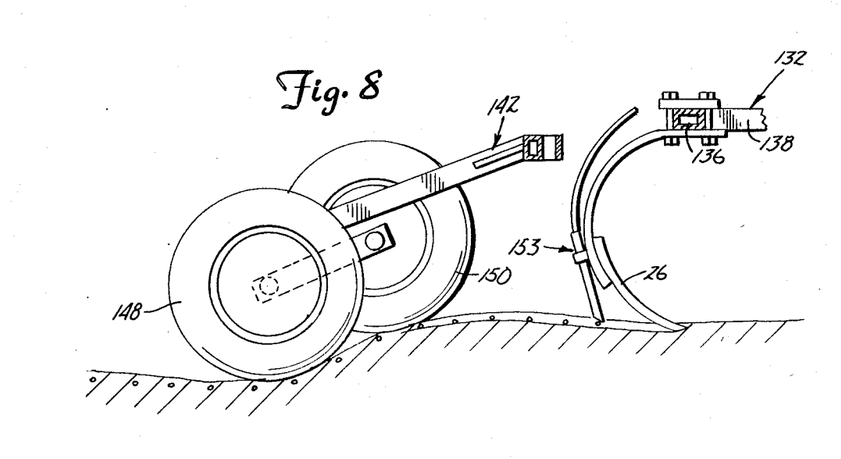
FIG. 8 (sheet 4) is a vertical sectional view taken along line 8—8 of FIG. 7.

The wheels 148 and 150 of each wheel pair assembly 146 are rotatably and pivotally mounted on the wheel support gang 142 in the same fashion (by a pivotal walking beam arrangement) as the wheels 34 and 36 are mounted on each wheel support gang 30. As shown in FIG. 8 (sheet 4), this allows each of the wheels 148 and 150 to follow the contours of the ground as the implement 10 passes over uneven terrain.

FIG. 8 also illustrates the compaction action of the wheels when the implement 10 is provided with a seed dropping device 153. Seeds are fed through the dropping device 153 from a seed source (not shown) and dropped into a rut gouged by the tiller 26. As the implement 10 is advanced, the compaction wheel runs over the rut to press the soil around and over each seed. The application of seed to the soil in this manner is quite efficient. In only one pass of the implement 10, the surface being worked is tilled, the seeds are sown, and the soil adjacent each seed is compacted.

It is understood that although only one wing 132 has been shown and described, additional wing portions can be mounted on the implement 10. Each wing is thus provided with its own wheel support gang to provide compaction and support for the tillers mounted on the wing upon which the gang is movably mounted.

Figure 9:
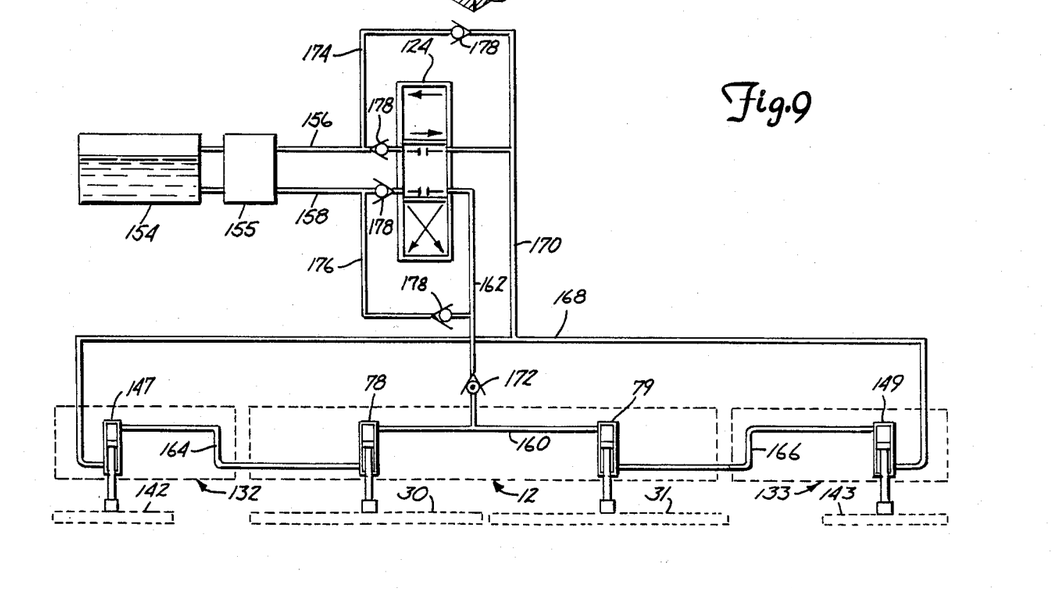
FIG. 9 (sheet 3) is a schematic view of the hydraulic system for the frame height control means of the present invention.

When the implement 10 is provided with wing portions, the hydraulic actuators of the wheel support gangs are operably connected as shown in FIG. 9 (sheet 3) so that all frame portions are jointly controlled and maintained at a substantially similar height relative to the ground. FIG. 9 schematically shows a frame height control system for an implement 10 having a main frame 12 and two wings 132 and 133. The main frame 12 has two wheel support gangs 30 and 31 pivotally mounted thereon and each wing 132 and 133 has a wheel support gang 142 and 143 pivotally mounted thereon, respectively. The longitudinal pivoting movement of the wheel support gangs 30 and 31 relative to the main frame 12 is controlled by hydraulic actuators 78 and 79. The longitudinal pivoting movement of the wheel support gangs 142 and 143 on the wings 132 and 133 are controlled by hydraulic actuators 147 and 149, respectively.

The hydraulic actuators 78, 79, 147 and 149 are operably connected with the control valve 124 as shown in FIG. 9. Hydraulic fluid from a fluid reservoir 154 is pumped by a pump 155 to and from the valve 124 of the system through a pair of fluid feed lines 156 and 158. The valve 124 is a four-way valve for controlling the flow of the hydraulic fluid to the actuators, as shown schematically in FIG. 9. The hydraulic actuators 78 and 79 are connected by a first parallel fluid line 160 to operate in parallel. The first parallel fluid line 160 is connected to the valve 124 by a first central fluid line 162. The hydraulic actuators 147 and 149 for the wings 132 and 133 are connected in series to the hydraulic actuators 78 and 79 by a first series fluid line 164 and a second series fluid line 166, respectively. These hydraulic actuators 147 and 149 are, in turn, connected in parallel by a second parallel fluid line 168, which is connected to the valve 124 by a second central fluid line 170.

The hydraulic actuators 78 and 79 on the main frame 12 have matching cylinder portions with equal cross sectional displacement values so that their piston rods extend and retract in equal amounts when actuated in parallel. Similarly, the hydraulic actuators 147 and 149 on the wings 132 and 133 have matching cylinder portions with equal displacement values so that their piston rods extend and retract in equal amounts when actuated in parallel. The matched cylinder portions of actuators 147 and 149 have smaller displacement values than the matched cylinder portions of actuators 78 and 79, but are dimensioned such that when the actuators are operably connected in series as shown in FIG. 9, the piston rods of all four actuators 78, 79, 147 and 149 move together upon actuation. As hydraulic fluid flows through the central fluid lines 162 and 170 toward and away from the actuators, the piston rods of the actuators all extend or retract, as desired, in equal amounts.

Extension of the hydraulic actuators raises the implement 10 relative to the ground. In that instance, the hydraulic fluid flows to the actuators 78 and 79 on the main frame 12 through the first central fluid line 162 and first parallel fluid line 160 from the valve 124 and returns through the second parallel fluid line 168 and the second central fluid line 170 to the valve 124. As the fluid forces the piston rods of the actuators 78 and 79 outwardly, fluid is forced through the series fluid lines 164 and 166 to the actuators 147 and 149 on the wings 132 and 133. This fluid forces the piston rods of these actuators 147 and 149 outwardly the same distance as the piston rods of the actuators 78 and 79, causing fluid to be forced through the second parallel fluid line 168 to the second central fluid line 170. Retraction of the hydraulic actuators is achieved by actuating the control valve 124 to reverse the flow of fluid to the actuators through the various fluid lines. As described, the valve 124 is actuated by either the linear actuator 126 or by the ground gauging means mounted on the main frame 12.

A sudden lowering or dropping of the implement 10 could cause damage to the tillage implements carried thereon. To prevent such an occurence, an orifice check valve 172 is placed in the first central fluid line 162 so that the normal flow of fluid in direction away from the hydraulic actuators is limited and constant. Thus, the lowering of the implement 10 to the ground as the actuators 78, 79, 147 and 149 are extended is also limited and constant. Fluid pressure release lines 174 and 176 and check valves 178 are provided to direct the fluid flow correctly through the system and relieve pressure at the valve 124.

The frame height control means as shown and described provides a system for uniformly adjusting the height of the implement 10 relative to the ground and maintaining the implement 10 at that selected height during tillage operations. The system additionally raises the implement 10 so that the tillers 26 mounted thereon are above the surface of the ground for transport with the weight of the implement 10 carried upon the wheels of the wheel support gangs.

Figure 10:
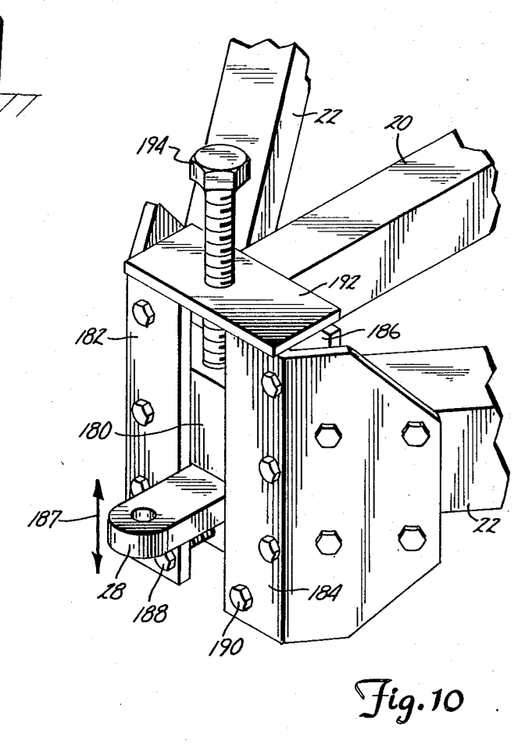
FIG. 10 (sheet 4) is an enlarged perspective view of the movable hitch of the present invention.

In addition to the frame height control means, the height of the implement 10 is adjustable at the forward end 14 of the main frame 12 by the movably mounted hitch 28. As shown in FIGS. 1, 2 and 10, the hitch 28 is secured to a block 180 which is slidably mounted in a channel defined by front plates 182 and 184 and a back plate 186. The block 180 is freely slidable in the channel in the directions indicated by arrow 187. Downward travel of the block 180 (and hitch 28 thereon) is limited by a pair of stop bolts 188 and 190, while the upward travel of the block 180 is limited by a top plate 192 upon which a height control bolt 194 is threadably mounted. When the hitch 28 is secured to a drawing vehicle, the block 180 slides upwardly in the channel because of the weight of the implement 10. The extent of upward travel of the block 180 is dependent on the position of the control bolt 194. By varying the position of the control bolt 194, the height of the frame 12 of the implement 10 is adjustable relative to the hitch 28 and drawing vehicle.

CONCLUSION

The present invention provides both compaction and support for an agricultural tillage implement. The implement has a plurality of tillers with a compaction wheel disposed immediately behind each tiller. The axles of adjacent wheels are staggered longitudinally to reduce soil build up and the wheels provide the primary support for the weight of the implement during both tillage operations and transport. The wheels are mounted rearwardly of the implement in gangs which pivot both laterally and longitudinally relative to the implement frame so that the wheels are able to track the ground over uneven terrain. The height of the implement frame, and thus the tilling depth of the tillers, is selectively controlled by longitudinally pivoting the wheel support gangs relative to the frame.

The apparatus of the present invention maintains the height of the implement frame (and the depth of the tillers mounted thereon) at a preselected level (relative to the ground) during operation, even when the implement is drawn over uneven terrain. One pass of an implement having the compaction and support apparatus of the present invention efficiently and economically performs three functions—the surface being worked is tilled, the seeds are sown and the soil adjacent each seed is compacted. Even greater efficiency is attained when folding wing portions are added to the implement frame to increase its operating width.

Although the present invention has been described with reference to preferred embodiments, workers skilled in the art will recognize that changes may be made in form and detail without departing from the spirit and scope of the invention.

What is claimed is:

1. A compaction apparatus for packing the ground immediately after tillage, the apparatus comprising:
    a frame having a plurality of tillers supported in spaced relation thereby;
    a wheel support gang movably mounted on the frame adjacent a rearward end of the frame;
    a plurality of compaction and support wheels, one of said wheels being provided per each and every tiller supported on said frame with the wheels being rotatably mounted on the wheel support gang parallel to each other and each wheel being longitudinally disposed behind its respective one of the tillers on the frame with adjacent wheels staggered longitudinally;
    vertically movable means for mounting each wheel on the wheel support gang in such a manner that each wheel moves generally independently to substantially follow the contour of the ground while supporting the frame for transport and operation; and
    frame height control means for adjusting the height of the frame relative to the wheel support gang and thus controlling the extent of tiller penetration into the ground.

2. The apparatus of claim 1 wherein the frame has hitch means vertically movably mounted on a forward end of the frame in such a manner that the height of the frame is adjustable relative to the hitch means.

3. The apparatus of claim 2 wherein the frame height control means adjusts the height of the frame relative to the wheel support gang.

4. The apparatus of claim 1 wherein the frame has a central portion and at least one wing portion pivotally mounted longitudinally to the central portion on a side of the central portion, and at least one wheel support gang being movably mounted adjacent a rearward end of each frame portion to provide support and compaction for each frame portion.

5. The apparatus of claim 4 wherein the central frame portion has hitch means vertically movably mounted on a forward end of the central frame portion in such a manner that the height of the frame is adjustable relative to the hitch means.

6. The apparatus of claim 5 wherein the frame height control means has means for varying the height of each frame portion relative to the wheel support gangs mounted thereon, the varying means being operably connected to simultaneously adjust the height of the frame portions.

7. The apparatus of claim 4 and further comprising:
    contour following means for pivotally mounting each wheel support gang to its frame portion on a lateral axis relative to the frame portion.

8. The apparatus of claim 4 and further comprising:
    means for pivotally mounting each wheel support gang to its frame portion on a longitudinal axis relative to the frame portion.

9. The apparatus of claim 1 and further comprising:
    contour following means for pivotally mounting the wheel support gang to the frame on a lateral axis relative to the frame.

10. The apparatus of claim 1 and further comprising:
    means for pivotally mounting the wheel support gang to the frame on a longitudinal axis relative to the frame.

11. The apparatus of claim 1, and further comprising:
    hitch means adjacent a forward end of the frame for selectively securing the frame to a towing vehicle; and
    means for moving a portion of hitch means vertically with respect to the forward end of the frame.

12. A compaction apparatus for packing the ground immediately after tillage, the apparatus comprising:
    a frame having a plurality of tillers supported in spaced relation thereby;
    a wheel support gang movably mounted on the frame adjacent a rearward end of the frame;
    a plurality of compaction and support wheels, the wheels being rotatably mounted with respect to the wheel support gang parallel to each other and each wheel being disposed behind one of the tillers on the frame with adjacent wheels staggered longitudinally;

a plurality of walking beams pivotally mounted on the wheel support gang, two of the compaction and support wheels being rotatably mounted on opposite ends of each walking beam, and each walking beam being pivotally mounted to the wheel support gang at a point on the walking beam between the two wheels supported thereby in such a manner that each wheel substantially follows the contour of the ground while supporting the frame for transport and operation; and frame height control means for adjusting the height of the frame relative to the wheel support gang and thus controlling the extent of tiller penetration into the ground.

13. The apparatus of claim 12, and further comprising:

hitch means adjacent a forward end of the frame for selectively securing the frame to a towing vehicle; and means for moving a portion of hitch means vertically with respect to the forward end of the frame.

14. The apparatus of claim 12 wherein the frame height control means adjusts the height of the frame relative to the wheel support gang.

15. A compaction apparatus for packing the ground immediately after tillage, the apparatus comprising:

a frame having a plurality of tillers supported in spaced relation thereby, the frame having a central portion and at least one wing portion pivotally mounted longitudinally to the central portion on a side of the central portion;

at least one wheel support gang being movably mounted on each frame portion adjacent a rearward end of each said portion to provide support and compaction for each frame portion;

a plurality of compaction and support wheels, the wheels being rotatably mounted on each wheel support gang parallel to each other and each wheel being disposed behind one of the tillers on the frame with adjacent wheels staggered longitudinally;

a plurality of walking beams pivotally mounted on each wheel support gang, two of the compaction and support wheels being rotatably mounted on opposite ends of each walking beam, and each walking beam being pivotally mounted to its wheel support gang at a point on the walking beam between the two wheels supported thereby in such a manner that each wheel substantially follows the contour of the ground while supporting the frame for transport and operation; and frame height control means for adjusting the height of the frame relative to the wheel support gang and thus controlling the extent of tiller penetration into the ground.

16. The apparatus of claim 15 wherein the central frame portion has hitch means vertically movably mounted on a forward end of the central frame portion in such a manner that the height of the frame is adjustable relative to the hitch means.

17. The apparatus of claim 16 wherein the frame height control means has means for varying the height of each frame portion relative to the wheel support gangs mounted thereon, the varying means being operably connected to simultaneously adjust the height of the frame portions.

18. The apparatus of claim 15, and further comprising:

hitch means adjacent a forward end of the frame for selectively securing the frame to a towing vehicle; and means for moving a portion of hitch means vertically with respect to the forward end of the frame.

19. The apparatus of claim 15 and further comprising:

means for pivotally mounting each wheel support gang to its frame portion on a longitudinal axis relative to the frame portion.

* * * * *